United States Patent Office 3,036,938
Patented May 29, 1962

3,036,938
METHOD OF PURIFYING AND SPHERIFYING COPPER POWDER
Percy W. Hudson, 305 Main St., Old Saybrook, Conn.
No Drawing. Filed June 10, 1958, Ser. No. 740,997
2 Claims. (Cl. 148—13.2)

This invention relates to a method of making copper powder suitable for use in powder metallurgical procedures and for other purposes.

Impure copper powder commonly is made by precipitation from aqueous solution of copper salts such as the chloride by means of less noble metals such as iron and aluminum and normally is contaminated by chlorides such as copper chloride and the chloride of the precipitating metal e.g. iron or aluminum chloride. It has been found to be very difficult to eliminate the last trace of chlorides from such a precipitated copper powder by washing with water.

An object of my invention is to provide a process for the elimination of contaminating chlorides from precipitated copper powder and to recover the purified copper powder in a useful form. According to one modification of my invention the purified copper powder is recovered in the form of rounded relatively coarse powder or granules having smooth outer surfaces and porous interiors and suitable for use for powder metallurgy. According to another modification of my invention the purified copper powder is recovered in a very finely divided form having a particle size of the order of 3 microns.

In accordance with my invention the impure copper powder, contaminated with chlorine in the form of one or more metal chlorides, e.g. precipitated copper still wet with the solution from which it has been precipitated, is heated up to a temperature of about 1500° F. in an atmosphere of an inert gas such as helium or argon. At this temperature the chlorides present e.g. copper chloride, aluminum chloride and/or iron chloride, vaporize. The inert gas atmosphere is moved, if necessary to carry away the vaporized chlorides. The inert gas may be circulated and treated at a suitable point in the circuit, e.g. washed with water, to remove the vaporized chlorides therefrom and if desired the vaporized chlorides may thus be recovered as a valuable by-product of the process. Copper chloride, for instance may be recovered and used, by precipitation, to make more copper powder.

The heating of the impure copper powder in the inert gas is continued until the desired degree of purity is attained. The heating time will depend upon the method of heating e.g. the size of the body of powder treated and the efficiency of its contact with the inert gas. A few minutes heating after the powder has attained the heating temperature generally is adequate. After the heating operation the copper powder will be in the form of a friable spongy mass. This sponge is cooled to room temperature in the inert atmosphere in which it was heated and is then pulled apart by a tearing action by means of a mill which does not compress the powder. Such a mill is available on the market e.g. a rotating plate mill manufactured by the Robin Manufacturing Co. of Muncie, Pa. After the sponge has been pulled apart the resulting sponge particles are run through a hammer mill at such a rate of feed and adjustment that they are converted into roughly spherical particles which are spongy in their interiors but burnished on their exterior surfaces. This conformation of the powder is highly suitable for use for the fabrication of parts by the procedures of powder metallurgy. The porous inner portions of the particles promote compressibility while the burnished surfaces promote flow of the powder and excellent sintering with their attendant manufacturing advantages and the improved physical attributes of the resulting articles.

In a modification of the above described process the wet precipitated copper, contaminated with chloride is brought in the form of a wet mass or sludge into contact with metallic aluminum preferably in the form of thin strips or wires and the mixture is placed in an aluminum container or conveyor and heated in a neutral or inert atmosphere to a temperature of 800–1200° F. In this process the metallic aluminum reacts with any copper chloride present liberating metallic copper and forming aluminum chloride which is vaporized and removed in the heating operation.

The result of the heating step is a soft powder and does not require milling to separate the individual particles which have an average particle size of about 3 microns and a purity of 99.8+%. This powder is useful directly for a variety of purposes and may be heated to about 1500° F. and worked up into roughly spherical granules suitable for powder metallurgy as described above.

I claim:
1. Method of purifying copper powder which is contaminated with copper chloride which comprises heating the powder to a temperature of about 1500° F. in an inert atmosphere to vaporize and remove the copper chloride and convert the copper powder into a spongy mass, cooling said spongy mass, pulling the spongy mass apart to a particle size suitable for powder metallurgy and subjecting the resulting particles to the action of a hammer mill to convert them into spherical particles having smooth surfaces and spongy interiors.

2. A method of purifying copper powder which is contaminated with copper chloride which comprises contacting the powder in the form of a wet mass with metallic aluminum, heating the powder while still in contact with metallic aluminum in an inert atmosphere to a temperature of from 800° F. to 1200° F. to react the copper chloride with aluminum and form aluminum chloride and to vaporize and expel said aluminum chloride, heating the resulting copper powder to about 1500° F. in an inert atmosphere to form a friable spongy mass, tearing said mass apart to a particle size suitable for powder metallurgy and subjecting the resulting particles to the action of a hammer mill to convert them into spherical particles having smooth surfaces and spongy interiors.

References Cited in the file of this patent
UNITED STATES PATENTS

| | | |
|---|---|---|
| 2,773,760 | Winter | Dec. 11, 1956 |
| 2,787,534 | Golwynne | Apr. 2, 1957 |

FOREIGN PATENTS

| | | |
|---|---|---|
| 293,609 | Great Britain | July 12, 1928 |